United States Patent
Kuth et al.

(10) Patent No.: US 9,827,679 B2
(45) Date of Patent: Nov. 28, 2017

(54) SPECIFIABLE MOBILITY FOR A ROBOTIC DEVICE

(71) Applicant: Siemens Aktiengesellschaft, München (DE)

(72) Inventors: Rainer Kuth, Hoechstadt (DE); Philip Mewes, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 4 days.

(21) Appl. No.: 14/938,909

(22) Filed: Nov. 12, 2015

(65) Prior Publication Data

US 2016/0144504 A1    May 26, 2016

(30) Foreign Application Priority Data

Nov. 20, 2014   (DE) .................. 10 2014 223 701

(51) Int. Cl.
*B25J 9/00*    (2006.01)
*B25J 9/16*    (2006.01)
(Continued)

(52) U.S. Cl.
CPC ........... *B25J 9/1689* (2013.01); *B25J 9/1676* (2013.01); *B25J 13/003* (2013.01); *B25J 13/02* (2013.01);
(Continued)

(58) Field of Classification Search
None
See application file for complete search history.

(56) References Cited

U.S. PATENT DOCUMENTS 5,408,409 A * 4/1995 Glassman .............. B25J 9/1679
                                                        128/920
6,463,361 B1   10/2002 Wang
(Continued)

FOREIGN PATENT DOCUMENTS

CN    1758366 A     4/2006
DE    19624680 A1   1/1998
(Continued)

OTHER PUBLICATIONS

Ivo Baæa, et.al.: "Voice-Controlled Robotic Arm in Laparoscopic Surgery", in: Klinik für Allgemein- und Unfallchirurgie, vol. 40, No. 3, pp. 1-4, Mar. 1999.
(Continued)

*Primary Examiner* — Ryan Rink
(74) *Attorney, Agent, or Firm* — Harness, Dickey & Pierce, P.L.C.

(57) ABSTRACT

A robotic device includes a kinematic chain of a plurality of components, movable relative to each other; a sensor device configured to capture a force and/or moment exerted on at least one of the mobile components; a control device configured to control a movement of the at least one of the mobile components, in the direction of the force that is exerted, as a function of the force captured by the control device and/or of the moment captured by the control device; and a first capture device coupled to the control device and provided for the purpose of contactlessly capturing an operating action of an operator. In a normal operating mode, the control device is configured to specify a mobility of at least one of the mobile components as a function of the captured operating action, improving accuracy and reliability of the device in interaction with a human operator.

19 Claims, 1 Drawing Sheet

(51) Int. Cl.
  *B25J 13/00* (2006.01)
  *B25J 13/02* (2006.01)
  *B25J 13/04* (2006.01)
  *B25J 19/06* (2006.01)

(52) U.S. Cl.
  CPC ............... *B25J 13/04* (2013.01); *B25J 19/06* (2013.01); *G05B 2219/35455* (2013.01); *G05B 2219/40074* (2013.01); *G05B 2219/40184* (2013.01); *G05B 2219/45118* (2013.01); *Y10S 901/04* (2013.01)

(56) References Cited

U.S. PATENT DOCUMENTS

| | | | |
|---|---|---|---|
| 6,785,358 | B2 | 8/2004 | Johnson |
| 7,921,017 | B2* | 4/2011 | Claus ................... A61B 17/00 704/231 |
| 2004/0003136 | A1 | 1/2004 | Murawski et al. |
| 2004/0260145 | A9* | 12/2004 | Borst .................... A61B 17/02 600/37 |
| 2005/0010892 | A1 | 1/2005 | McNair et al. |
| 2005/0245191 | A1 | 11/2005 | Falcon |
| 2007/0027459 | A1* | 2/2007 | Horvath ................ A61B 90/98 606/147 |
| 2007/0144298 | A1* | 6/2007 | Miller ................... B25J 9/1676 74/490.01 |
| 2007/0165775 | A1* | 7/2007 | Graumann ........... A61B 6/4441 378/19 |
| 2008/0217564 | A1* | 9/2008 | Beyar .................... A61B 6/00 250/515.1 |
| 2008/0258929 | A1* | 10/2008 | Maschke ............... A61B 6/102 340/686.1 |
| 2009/0048611 | A1* | 2/2009 | Funda ................ A61B 1/00193 606/130 |
| 2010/0063514 | A1 | 3/2010 | Maschke |
| 2011/0196377 | A1* | 8/2011 | Hodorek .............. A61B 17/155 606/87 |
| 2011/0295399 | A1 | 12/2011 | Plociennik et al. |
| 2013/0110130 | A1 | 5/2013 | Manzo |
| 2013/0253378 | A1* | 9/2013 | Claypool ................ A61F 2/389 600/595 |
| 2014/0039517 | A1* | 2/2014 | Bowling .................. B25J 13/00 606/130 |
| 2014/0171964 | A1* | 6/2014 | Yang ..................... A61B 34/30 606/130 |
| 2014/0316433 | A1* | 10/2014 | Navve .................... A61B 34/70 606/130 |
| 2015/0150639 | A1* | 6/2015 | Diolaiti ................... B25J 9/161 606/130 |
| 2015/0217455 | A1* | 8/2015 | Kikkeri .................. B25J 9/1676 700/259 |
| 2016/0125895 | A1* | 5/2016 | Gandhi ................... G10L 25/48 704/275 |

FOREIGN PATENT DOCUMENTS

| | | |
|---|---|---|
| DE | 102008022924 A1 | 11/2009 |
| DE | 102008027008 A1 | 12/2009 |
| DE | 102009051148 A1 | 5/2010 |
| WO | WO 2006105567 A2 | 10/2006 |

OTHER PUBLICATIONS

German Office Action dated Oct. 28, 2015.
Office Action for Chinese Patent Application No. 201510809613.4 dated May 4, 2017 and English translation thereof.

* cited by examiner

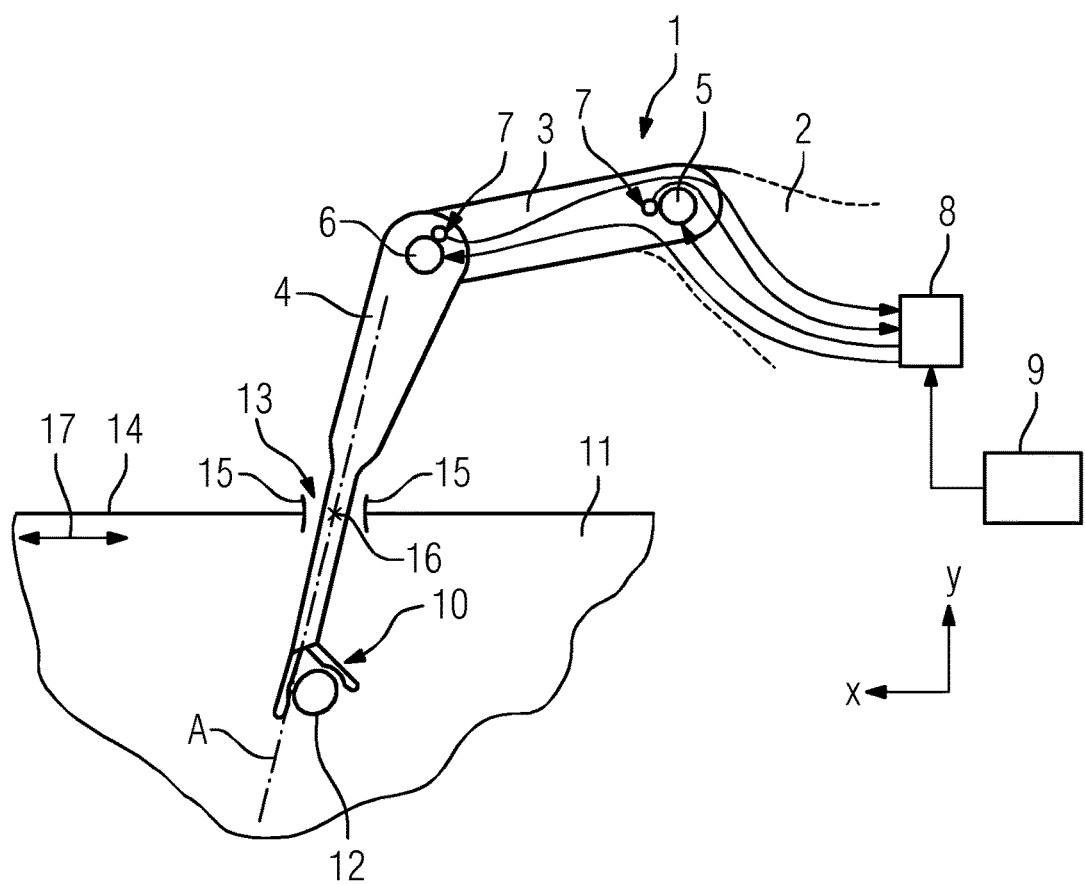

SPECIFIABLE MOBILITY FOR A ROBOTIC DEVICE

PRIORITY STATEMENT

The present application hereby claims priority under 35 U.S.C. §119 to German patent application number DE 102014223701.7 filed Nov. 20, 2014, the entire contents of which are hereby incorporated herein by reference.

FIELD

At least one embodiment of the invention generally relates to a robotic device including a kinematic chain of a plurality of components which can move relative to each other, a sensor device which is so configured as to capture a force and/or a moment that is exerted on at least one of the mobile components, and a control device which is so configured as to control a movement of the at least one of the mobile components, in the direction of the force that is exerted, as a function of the captured force and/or the captured moment. At least one embodiment of the invention also generally relates to a method for operating such a robotic device.

BACKGROUND

Although much has been made in the past of replacing human work by robots or a robotic device, the robot or the robotic device is primarily used today as a means of assistance. The strict separation between pure automation and manual work is increasingly redundant. Powerful sensors, intelligent control engineering and advanced software technologies are integrated into modern robotic devices. A further common possibility is for these robots to allow movement in a passive manner under the hand of an operator, e.g. a surgeon. An operator who interacts with a robotic device as an assistant, e.g. a surgeon during a robot-supported operation, must often perform very complex maneuvers. At the same time, it is very often the case that identical maneuvers are repeated in many applications. In medical interventions in particular, the speed of movement and the accuracy of trajectory are critical to the result of the operation. A number of approaches exist for the purpose of improving the interaction between operator and an assisting robotic device.

For example, U.S. Pat. No. 6,463,361 B1 discloses a robotic system which analyzes voice commands of a user in order to move a medical instrument. U.S. Pat. No. 6,785,358 B2 likewise involves an analysis of voice commands in order to control a medical device, specifically an x-ray system in this case.

US 2013/0110130 A1 describes a control system for a medical robotic device. This control system allows the setting of a desired torque which is precisely implemented at the desired strength despite fatigue of e.g. wires or Bowden cables of the robotic device.

SUMMARY

At least one embodiment of the invention is directed to improving the accuracy and reliability of a robotic device, particularly when the device interacts with a human operator.

Advantageous embodiment variants are derived from the dependent claims, the description and the FIGURES.

At least one embodiment of the invention relates to a robotic device comprising a kinematic chain of a plurality of components which can move relative to each other, a sensor device and a control device. In this case, the sensor device is so configured as to capture a force and/or a moment which is exerted on at least one of the mobile components. The control device is so configured as to control a movement of the at least one of the mobile components, in the direction of the exerted force, as a function of the force captured by the sensor device and/or the moment captured by the sensor device. The robotic device, more precisely at least one of the mobile components of the robotic device, can therefore be guided by an operator by way of the operator manually exerting a force on the mobile component in a desired direction.

At least one embodiment of the invention also relates to a method for operating a robotic device. The robotic device here comprises a kinematic chain of a plurality of components which can move relative to each other, a sensor device which can capture a force that is exerted on at least one of the mobile components of the robotic device, and a control device which controls a movement of the mobile component in the direction of the exerted force as a function of a force that is captured by the sensor device. In this case, the method is characterized by the steps of contactlessly capturing an operating action of an operator by way of a first capture device, and specifying a mobility of at least one mobile component by way of the control device in a normal operating mode as a function of the captured action, specifically by enabling or disabling at least one predetermined movement which is assigned to the operating action. Advantageous embodiments and advantages correspond to the advantageous embodiments and advantages of the apparatus.

All of the features and combinations of features cited above in the description, and all of the features and combinations of features cited below in the description of the FIGURES and/or shown in the FIGURES alone may be used not only in the combination specified in each case, but also in other combinations or in isolation without thereby departing from the scope of the invention. The invention must therefore be considered also to encompass and disclose embodiments which are not explicitly shown or explained in the FIGURES, but are nonetheless implied by and can be derived from the exemplified embodiments by virtue of separate combinations of features.

BRIEF DESCRIPTION OF THE DRAWINGS

The sole FIGURE in this case shows a schematic sectional view of an exemplary medical robotic device during an example operative intervention.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the FIGURES.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the FIGURE. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the FIGURES. For example, two FIGURES shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the FIGURES. It will be understood that the spatially relative terms are intended to encompass different orientations of the device in use or operation in addition to the orientation depicted in the FIGURES. For example, if the device in the FIGURES is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

At least one embodiment of the invention relates to a robotic device comprising a kinematic chain of a plurality of components which can move relative to each other, a sensor device and a control device. In this case, the sensor device is so configured as to capture a force and/or a moment which is exerted on at least one of the mobile components. The control device is so configured as to control a movement of the at least one of the mobile components, in the direction of the exerted force, as a function of the force captured by the sensor device and/or the moment captured by the sensor device. The robotic device, more precisely at least one of the mobile components of the robotic device, can therefore be guided by an operator by way of the operator manually exerting a force on the mobile component in a desired direction.

In order to improve the accuracy and reliability when interacting with a human operator, the robotic device comprises a first capture device which is coupled to the control device and is provided for the purpose of contactlessly capturing an operating action of the operator. In this case, in a normal operating mode the control device is so configured as to specify a mobility of at least one of the mobile components, as a function of the operating action captured by the first capture device, by enabling or disabling at least one predetermined movement which is assigned to the captured operating action. Degrees of freedom of mobility of the robotic device can therefore be restricted or unlocked by the operator via an operating action of the operator, the operating action being captured by the first capture device.

This may be achieved by way of so-called Active Constraints, wherein the degrees of freedom of mobility are restricted by selectively activating one or more drive elements and/or one or more brakes. Movements of the robotic device can therefore be disabled or enabled by blocking and/or releasing specified axes of rotation of the mobile components.

The control device of the robotic device takes responsibility for the so-called Constraint Handling, i.e. the selective activation. This has the advantage that an operator does not have to interrupt an action in progress, in particular guiding a mobile component of the robotic device, in order to influence the mobility of the robotic device, in particular the mobility of the mobile components being guided.

It is precisely when a movement or a maneuver (i.e. a sequence comprising a plurality of different movements) has to be performed repeatedly and with a high degree of accuracy that a restriction of the mobility can prevent the movement or maneuver from being performed incorrectly and improve the accuracy of the interaction. It is also possible thus to guard against operator fatigue, since less concentration is required in order to perform the movement correctly and/or quickly, and therefore the reliability of the interaction is increased.

In an advantageous embodiment variant, the control device is so configured as to enable or disable at least one group of movements as a function of the operating action. Different groups of movements may also be enabled or disabled at the same time.

In particular, provision may be made for disabling translational movements having a movement portion which runs parallel to a specified plane or surface, and/or disabling translational movements in a specified direction. In the case of a translational movement comprising a plurality of movement portions, it is also possible to disable and/or enable only one or a plurality of these movement portions as specified. If the robotic device is a medical robotic device, it is therefore possible e.g. to prevent any further advance along an instrument axis of a medical instrument which is attached to or part of the kinematic chain, but to allow a withdrawal, i.e. a backward movement.

In the case of a medical robotic device, it is also possible to disable translational movements having a movement portion which is parallel to the skin surface. It is also possible to disable translational movements having a speed which exceeds a predetermined maximum speed and/or rotational movements having an angular speed which exceeds a predetermined angular speed. It is also particularly advantageous to disable rotational movements which do not take place about a specified axis of rotation or a specified center of rotation.

If the robotic device is a medical robotic device, rotations may be permitted or authorized only if their center of rotation lies in the so-called trocar center, for example. The trocar center is the center of the trocar which, in the form of a flange, holds open an opening or hole in the body of the patient, and through which a medical instrument of the medical robotic device is introduced into the patient. Particularly in the growing number of minimally invasive medical operative interventions, the openings held open by the trocar are very small, and therefore any movement about a center of rotation which is not situated in the trocar center very easily results in harm to the patient.

By virtue of enabling or disabling groups of movements, unwanted movements which could result in e.g. harm to a patient are already prevented to some extent, and therefore desired movements of the robotic device can also be performed particularly precisely. For example, this might occur if movements leading away from an intended path of movement or trajectory are disabled and therefore prevented, such that an operator is assisted in the desired movement by a type of barrier effect.

In a further embodiment variant, it is envisaged that the robotic device is a robot of lightweight construction, having a mass of less than 70 kg, in particular less than 35 kg. This has the advantage of preventing any unwanted deviation of the robotic device or a mobile component thereof from a path of movement corresponding to the desired ideal movement, as can very easily occur in the case of a lightweight robot as a consequence of even a slight unwanted force effect due to its modest mass.

In a particularly advantageous embodiment variant, provision is made for the first capture device to comprise or be a voice capture device and/or a gesture capture device, and is so configured as to capture a voice instruction or a gesture as an operating action. In particular, the gesture capture can also capture a head gesture or a viewing direction as an operating action. This has the advantage that the hands of an operator are not required in order to activate or deactivate the Constraints, i.e. to disable or enable a predetermined movement, or to specify a mobility. Therefore the operator does not have to interrupt any other manually effected operating action of the robotic device, or a medical intervention. This means that the operator can also control the interaction with the robotic device particularly accurately relative to time.

In a preferred embodiment variant, provision is made for the robotic device to comprise a further capture device, which is coupled to the control device and is used to capture a further operating action, in particular a foot and/or heel switch and/or a viewing direction detector. The further capture device may be so embodied as to be structurally independent of the first capture device. The further capture device, which is independent of the hands of the operator, further improves the interaction between robotic device and operator.

In this case, the control device may be so configured that an operating action which is captured by the first capture device is only taken into consideration if it is captured within a specified time interval with a further operating action which is captured by the second capture device. This has the advantage that an erroneous specification of the mobility is prevented, since two technical malfunctions or two unwanted operating actions would have to coincide for this to occur. The reliability of the robotic device is therefore increased in the interaction.

Alternatively, provision may be made for an operating action which is captured by the first capture device, in the event that the operating action relates to a disabling of an assigned movement, to be taken into consideration only if it is captured within a specified time interval with a further input which is captured by the second capture device, and in the event that the operating action relates to an enabling of an assigned movement, taken into consideration irrespective of a further input being captured by the further capture device. This has the advantage that any disabling of a mobility as per the above embodiment variant undergoes particular validation, while any releasing of a mobility can however take place without the validation and therefore particularly quickly. This means that the full mobility can be reestablished particularly quickly in an emergency.

In a further embodiment variant, the control device is so configured that in an emergency mode the mobility of the at least one mobile component is limited to at least one backward movement. In the backward movement, the at least one mobile component of the kinematic chain, in particular an end element of the kinematic chain, moves opposite to a last performed movement, in particular opposite to a last performed movement along a trajectory. In the latter case, the movement may also comprise a plurality of individual movements. The robotic device can therefore be switched into the aforementioned emergency mode. This has the advantage that a movement of the robotic device can be reversed particularly quickly and precisely in an emergency. Specifically if the robotic device is a medical robotic device, the medical robotic device can be safely removed particularly quickly and precisely in a medical emergency without an operator, e.g. a surgeon or an assistant, having to concentrate on the movement of the medical robotic device.

In a preferred embodiment variant, provision is made for the sensor device to comprise a torque sensor device which is integrated in the robotic device and/or a force sensor device which is integrated in the robotic device. In particular, both devices may be arranged in the mobile components of the kinematic chain in each case. This has the advantage that the specification of mobility can be checked particularly quickly and reliably, and no further devices occupying space are required.

In a further embodiment variant, provision is made for the robotic device to comprise an identification device which is coupled to the control device and is used to identify the operator, and for the control device to be so configured as to enable and/or to disable a predetermined movement which is assigned to the operating action only if the operator identified by the identification device is authorized to enable and/or disable according to a specified assignment. This has the advantage of preventing incorrect operation, i.e. an erroneous setting of a mobility, while at the same time allowing the robotic device to cooperate reliably with a plurality of different operators.

In a preferred embodiment variant, provision is made for the robotic device to have a device for preventing movement into a spatial region which is occupied by a person, and/or for avoiding or giving way to a person who moves into a spatial region which is occupied by the robot, such that the robotic device is suitable for human-robot cooperation in particular. The device may comprise e.g. cameras and/or pressure sensors on an external surface of the robotic device, as disclosed in the prior art for the purpose of human-robot cooperation. As a result, the robotic device or a mobile component thereof can be guided and hence controlled safely by an operator. This has the advantage that the robotic device can be adapted in a particularly flexible manner to the changing requirements of human-robot cooperation and can easily be used in different scenarios.

In a particularly preferred embodiment variant, provision is made for the robotic device to comprise a medical surgical device. This has the advantage of increasing the accuracy and reliability during a medical intervention or a medical procedure. It is therefore possible here in particular to avoid inaccuracies or errors having serious consequences for the patient.

In this case, the medical robotic device may comprise a detection device which is coupled to the control device and is used to capture at least one movement of at least a partial region of a patient. Moreover, in addition to the specification of the mobility of the mobile component in the normal operating mode, in a compensation mode the control device can then be so configured as to compensate for the movement of the partial region of the patient by moving at least one mobile component, irrespective of the mobility that has been set. A mobility can therefore also be set relative to a moving partial region of a patient. This has the advantage that a setting of a mobility cannot result in injury to the patient due to a movement of the patient. The increased precision and reliability of the robotic device can therefore still be achieved in the case of a moving (e.g. breathing) patient.

At least one embodiment of the invention also relates to a method for operating a robotic device. The robotic device here comprises a kinematic chain of a plurality of components which can move relative to each other, a sensor device which can capture a force that is exerted on at least one of the mobile components of the robotic device, and a control device which controls a movement of the mobile component in the direction of the exerted force as a function of a force that is captured by the sensor device. In this case, the method is characterized by the steps of contactlessly capturing an operating action of an operator by way of a first capture device, and specifying a mobility of at least one mobile component by way of the control device in a normal operating mode as a function of the captured action, specifically by enabling or disabling at least one predetermined movement which is assigned to the operating action. Advantageous embodiments and advantages correspond to the advantageous embodiments and advantages of the apparatus.

In the FIGURE, part of a robotic device 1 is schematically illustrated in a lateral view. The robotic device 1 is a medical robotic device in this case, embodied as a lightweight robot having a mass of less than 30 kg. It has a kinematic chain which comprises three mobile components 2, 3, 4 in this case. These mobile components 2, 3, 4 are coupled to each other via joints 5, 6. In the illustration shown, these joints allow rotation about axes of rotation which extend in a z-direction that is perpendicular to the plane of the drawing in the configuration shown here. However, any other desired axes of rotation are also feasible. Ball joints or a combination of joints which are oriented in different spatial directions may also be used for the joints 5, 6. In the example shown, the joints 5, 6 have sensors of a sensor device 7 which in this case captures a torque that is present at the joints 5, 6. The torque may be produced by an operator, for example.

The sensor device 7 is coupled to a control device 8 which can control the mobile components 2, 3, 4 of the robotic device 1 or a movement of these components, e.g. via actuators or brakes which are disposed in the joints 5, 6. The control device 8 is in turn coupled to a capture device 9, which is embodied here as a voice capture device for capturing a voice input of an operator. In the example shown, the control device 8 can specify the mobility of the mobile components 2, 3, 4 about the respective axes of the joints 5, 6 by activating so-called Constraints as a result of a voice input, i.e. specific movements or movement classes are disabled. If a disabled movement is released again, this takes the form of a deactivation of the corresponding Constraint. In this way, a movement of the robotic device 1 or one of the mobile components 2, 3, 4 of the robotic device 1, e.g. due to a force and therefore a torque being applied to the robotic device 1 by an operator, is prevented if this movement corresponds to the movements which have been prohibited by the current voice input. It is therefore possible a priori to prevent unwanted or accidental movements.

In the example shown, the final mobile component 4 of the kinematic chain forms a functional end element, comprising pincers 10 in this case. These are already inside a patient 11 here, having been introduced into the patient 11 via an opening 13. This opening 13 is held open in the example shown by a so-called trocar 15, i.e. a type of portal or flange. The opening 13 is held open thus in the skin surface 14 of the patient 11. The midpoint of the trocar 15 is called a trocar center 16. This is of particular interest, since rotations about the trocar center 16, as a center of rotation, are particularly advantageous for the patient 11 because the mobile component 4 which is embodied as an end element does not bump into the trocar 15 or the edge of the opening 13 during such rotations, and therefore cannot result in unintended injury to the patient 11.

The pincers 10 grasp a blood vessel 12, for example. This is fixed in a position thus by the robotic device 1, and the operator (e.g. a surgeon) can perform an operative intervention on the blood vessel 12 or an organ connected thereto. For the sake of clarity, neither the operator nor further medical devices or devices guided by the surgeon are illustrated here. If the surgeon now wishes to reposition the blood vessel 12 in the context of an intervention, for example, the risk of injury to the patient 11 can be reduced by way of the operator limiting the mobility of the robotic device 1 via a voice command. If the surgeon now wishes to reposition the blood vessel 12, he or she can exert a force on the pincers 10 or on the mobile component 4 embodied as an end element, e.g. by hand, such that the control device 8 moves the mobile component 4 in the direction of the force effect. In order to prevent any injury to the patient 11, the surgeon can however restrict the mobility of the robotic device in advance via a voice command in the present embodiment variant of the robotic device 1.

In the example shown, the control device 8 is so configured as to disable, in accordance with a corresponding voice input, translations of the mobile component 4, this being embodied as an end element, which are parallel to the skin surface 14 and therefore extend in an x-direction and a z-direction here. Consequently, in the example shown, only translations perpendicular to the skin surface, i.e. in a y-direction, are permitted. In order now to allow the blood vessel 12 nonetheless to be displaced in an x-direction, the robotic device must perform a rotation about an axis of rotation which extends parallel to the skin surface 14 and perpendicularly relative to the x-axis. The control device 8 is also so configured here as to permit a rotation of the mobile component 4 which is embodied as an end element about only one specified axis of rotation or center of rotation, in accordance with an activation of the corresponding restriction or limitation (i.e. the Constraint).

In the example shown, the specified center of rotation is the trocar center 16, since the skin surface 14 is not injured by the rotation of the mobile component 4 when rotation takes place about this point. Precisely this last cited limitation of the mobility of a specific component, here the mobile component 4, will be activated by the surgeon via voice command if he or she wishes to move the blood vessel 12 in an x-direction in the example shown. In this way, the desired movement of the blood vessel 12 by the robotic device 1 therefore takes place without injuring the patient. It is also possible in the example shown to limit the speed of a rotation, or to limit any further advance of the mobile component 4 embodied as an end element along the instrument axis A, i.e. any further advance of the mobile component 4 at the end of the instrument axis A of the medical instrument in the direction of the patient 11 in the example shown.

In the example shown, the control device 8 can also be switched into an emergency mode in which backward movements are performed by the robotic device 1, backward movements being movements which are used to remove an end element of the kinematic chain or a medical instrument attached to the end element such as the pincers 10 or another tool from the patient 11 or a workpiece being processed. However, all other translational and rotational movements are prohibited in this emergency mode. This may be achieved via a memory, for example, which provides the control device 8 with information about the movements that have been performed, wherein the movements can then be performed in reverse in the emergency mode.

In the example shown, a translation along the instrument axis A and out of the patient 11 is therefore allowed in the emergency mode. If the control device 8 is so configured as to process voice inputs only after prior release by a further input, e.g. a foot switch or a heel switch, the emergency mode can be activated via a voice input without additional validation by the further input, e.g. in order to increase the safety. It is also possible to configure the control device 8 such that activation of a Constraint, i.e. restricting or disabling a mobility, can only be effected with the further input from the cited foot switch or heel switch, for example, while deactivation of a Constraint, i.e. reestablishing the mobility, can also be performed via a voice command alone.

In the example shown, the control device 8 is moreover so configured as to compensate for a movement of the patient 11 or a partial region of the patient 11. In the example shown, a respiratory movement of the patient 11 causing a displacement of the thorax and hence the skin surface 14 as a partial region of the patient 11, parallel to the x-direction in this case, is symbolized by the dual-headed arrow 17. In this example, the control device 8 can be set via a voice command to compensate for the movement of the partial region of the patient 11, a respiratory movement here. This means that the blood vessel 12 here is not fixed in a position which is defined absolutely, but in a position which is defined relative to the moving partial region of the patient 11, namely the skin surface 14 here.

The movements of the robotic device 1 resulting from this restriction or specification are not subject to the restrictions of the mobility of the mobile components 2, 3, 4 in this case. Therefore if a movement of the mobile component 4 embodied as an end element is disabled in the x-direction parallel to the skin surface 14, for example, and the skin surface and hence the opening 13 moves in this direction in the example shown, the robotic device 1 is moved in this direction despite the restricted mobility in this direction, in order to compensate for the respiratory movement of the patient 11.

The aforementioned description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure and appended claims.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one embodiment of the invention relates to a non-transitory computer-readable storage medium comprising electronically readable control information stored thereon, configured in such that when the storage medium is used in a controller of a magnetic resonance device, at least one embodiment of the method is carried out.

Even further, any of the aforementioned methods may be embodied in the form of a program. The program may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. §112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A robotic device, comprising:
   a kinematic chain of a plurality of mobile components, movable relative to each other;
   a sensor device, configured to capture at least one of a force and a moment exerted on at least one of the mobile components;
   a control device, configured as to control a movement of the at least one of the mobile components at least one of,
      in a direction of the force exerted,
      as a function of the force captured by the sensor device,
      as a function of the moment captured by the sensor device;
   a first capture device, coupled to the control device and provided for hands free capturing constraint commands of an operator during operation of the robotic device; and
   a further capture device, coupled to the control device and used to capture at least one of a further constraint command or an operating action, wherein
      in a normal operating mode, the control device is so configured as to specify a mobility of at least one of the mobile components, as a function of the constraint command captured by the first capture device, by enabling or disabling at least one movement assigned to the constraint command, and wherein the control device is configured to take the constraint command captured by the first capture device, in the event that the operating action relates to a disabling of an assigned movement, into consideration only if it is captured within a specified time interval with a further input captured by the further capture device and, in the event that the constraint command relates to an enabling of an assigned movement, to take the constraint command into consideration irrespective of a further input being captured by the further capture device.

2. The robotic device of claim 1, wherein the control device is configured to enable or disable at least one group of movements as a function of the constraint command.

3. The robotic device of claim 1, wherein the robotic device is a robot of lightweight construction having a mass of less than 70 kg.

4. The robotic device of claim 1, wherein the first capture device comprises at least one of a voice capture device and a gesture capture device, and is configured to capture a voice instruction or a gesture as the constraint command.

5. The robotic device of claim 1, wherein the control device is configured to take the constraint command captured by the first capture device into consideration only if it is captured within a specified time interval with the at least one further constraint command or the operating action captured by the further capture device.

6. The robotic device of claim 1, wherein, in an emergency mode, the control device is configured to restrict the mobility of the at least one mobile component to at least one backward movement, in which the at least one mobile component of the kinematic chain moves opposite to a last performed movement.

7. The robotic device of claim 1, wherein the sensor device comprises at least one of:
a torque sensor device, integrated in the robotic device, and
a force sensor device, integrated in the robotic device.

8. The robotic device of claim 1, wherein the robotic device comprises an identification device coupled to the control device and is used to identify the operator, and wherein the control device is configured so as to at least one of enable and disable a movement assigned to the constraint command only if the operator identified by the identification device is authorized to at least one of enable and disable according to a specified assignment.

9. The robotic device of claim 1, further comprising:
a device to at least one of
prevent movement into a spatial region occupied by a person, and
avoid or give way to a person who moves into a spatial region occupied by the robot.

10. The robotic device of claim 1, further comprising:
a medical robotic device.

11. The robotic device of claim 10, further comprising:
a detection device, coupled to the control device and by which at least one movement of at least a partial region of a patient is capturable, wherein in addition to the specification of the mobility of the at least one mobile component in the normal operating mode, in a compensation mode the control device is configured to compensate for the movement of the partial region of the patient by moving at least one mobile component irrespective of the mobility that has been set.

12. A method for operating a robotic device including a kinematic chain of a plurality of mobile components movable relative to each other, a sensor device to capture a force exerted on at least one of the mobile components of the robotic device, and a control device to control a movement of the mobile components in a direction of the exerted force as a function of a force captured by the sensor device, the method comprising:
hands free capturing a constraint command of an operator during operation of the robotic device via a first capture device; and
specifying a mobility of at least one mobile component via the control device in a normal operating mode as a function of the captured constraint command
capturing at least one further constraint command or an operating action via a further capture device coupled to the control device, and
taking the constraint command captured by the first capture device, in the event that an operating action relates to a disabling of an assigned movement, into consideration only if it is captured within a specified time interval with a further input captured by the further capture device and, in the event that the constraint command relates to an enabling of an assigned movement, to take the constraint command into consideration irrespective of a further input being captured by the further capture device.

13. The robotic device of claim 2, wherein the control device is configured to at least one of:
disable translational movements having a movement portion which extends parallel to a specified plane or surface,
disable translational movements in a specified direction,
disable translational movements having a speed which exceeds a maximum speed,
disable rotational movements which do not take place about a specified axis of rotation or a specified center of rotation, and
disable rotational movements having an angular speed which exceeds a threshold angular speed.

14. The robotic device of claim 3, wherein the robotic device is a robot of lightweight construction having a mass of less than 35 kg.

15. The robotic device of claim 1, wherein the further capture device is at least one of:
a foot switch,
a heel switch, and
a viewing direction detector.

16. The robotic device of claim 6, wherein, the at least one mobile component of the kinematic chain is an end element of the kinematic chain, and moves opposite to a last performed movement along a trajectory.

17. The robotic device of claim 1, wherein the robotic device is configured for human-robot cooperation.

18. The robotic device of claim 9, wherein the robotic device is configured for human-robot cooperation.

19. The method of claim 12, wherein the mobility of the at least one mobile component is specified by enabling or disabling at least one movement assigned to the constraint command.

* * * * *